United States Patent
Khojastepour et al.

(10) Patent No.: US 12,267,140 B2
(45) Date of Patent: Apr. 1, 2025

(54) OPTIMIZING SCANNING BEAM PENETRATION

(71) Applicant: NEC Laboratories America, Inc., Princeton, NJ (US)

(72) Inventors: Mohammad Khojastepour, Lawrenceville, NJ (US); Nariman Torkzaban, College Park, MD (US)

(73) Assignee: NEC Corporation, Tokyo (JP)

( * ) Notice: Subject to any disclaimer, the term of this patent is extended or adjusted under 35 U.S.C. 154(b) by 29 days.

(21) Appl. No.: 18/311,353

(22) Filed: May 3, 2023

(65) Prior Publication Data

US 2023/0361849 A1 Nov. 9, 2023

Related U.S. Application Data (60) Provisional application No. 63/339,038, filed on May 6, 2022.

(51) Int. Cl.
- *H04B 7/06* (2006.01)
- *H04B 7/0426* (2017.01)
- *H04B 7/0495* (2017.01)

(52) U.S. Cl.
CPC ....... *H04B 7/06958* (2023.05); *H04B 7/0447* (2013.01); *H04B 7/0495* (2013.01); *H04B 7/0639* (2013.01)

(58) Field of Classification Search
CPC .................................. H04B 7/06958
USPC ....................................... 375/262
See application file for complete search history.

(56) References Cited

U.S. PATENT DOCUMENTS

| | | | | |
|---|---|---|---|---|
| 11,069,985 | B1* | 7/2021 | Noah | H01Q 1/38 |
| 2012/0166140 | A1* | 6/2012 | Weber | G06F 17/18 |
| | | | | 702/180 |
| 2014/0222653 | A1* | 8/2014 | Takayasu | G06Q 30/0283 |
| | | | | 705/37 |
| 2016/0344443 | A1* | 11/2016 | Vijayasankar | H04B 1/7143 |
| 2020/0186272 | A1* | 6/2020 | Athley | H04W 16/28 |

OTHER PUBLICATIONS

Khojastepour et al., "Multi-user Beam Alignment for Millimeter Wave Systems in Multi-path Environments", In 2020 54th Asilomar Conference on Signals, Systems, and Computers, IEEE, Nov. 1, 2020, pp. 549-553.

Busari et al, "5g millimeterwave mobile broadband: Performance and challenges," IEEE Communications Magazine, vol. 56, No. 6, Jun. 2018, pp. 137-143.

Kutty et al., "Beamforming for millimeter wave communications: An inclusive survey," IEEE Communications Surveys Tutorials, vol. 18, No. 2, Dec. 2015, pp. 949-973.

(Continued)

*Primary Examiner* — Lihong Yu
(74) *Attorney, Agent, or Firm* — Joseph Kolodka (57) ABSTRACT

Beamforming methods and systems include determining a tradeoff curve between scanning beamwidth and transmission beamwidth based on a channel distribution for a base station. A set of scanning beams is selected based on the tradeoff curve. Devices around the base station are scanned for using the set of scanning beams. A set of transmission beams is selected for communications with the devices based on information received during the scanning. The set of transmission beams are used for transmission with a beamforming transmitter.

17 Claims, 5 Drawing Sheets

(56) References Cited

OTHER PUBLICATIONS

Akdeniz et al, "Millimeter wave channel modeling and cellular capacity evaluation," IEEE Journal on Selected Areas in Communications, vol. 32, No. 6, Jun. 2014, pp. 1164-1179.
Nitsche et al., "Steering with eyes closed: Mm-wave beam steering without in-band measurement," in 2015 IEEE Conference on Computer Communications (INFOCOM), Apr. 2015, pp. 2416-2424.
Shahsavari et al., "Robust beam tracking and data communication in millimeter wave mobile networks," in 2019 International Symposium on Modeling and Optimization in Mobile, Ad Hoc, and Wireless Networks (WiOPT), Jun. 2019, pp. 1-8.
Barati et al., "Initial access in millimeter wave cellular systems," IEEE Transactions on Wireless Communications, vol. 15, No. 12, Sep. 2016, pp. 7926-7940.
Giordani et al., "Comparative analysis of initial access techniques in 5g mmwave cellular networks," in 2016 Annual Conference on Information Science and Systems (CISS), Apr. 2016, pp. 268-273.
Desai et al., "Initial beamforming for mmwave communications," in 2014 48th Asilomar Conf. on Signals, Systems and Computers, Nov. 2014, pp. 1926-1930.
Hussain et al., "Throughput optimal beam alignment in millimeter wave networks," in 2017 Information Theory and Applications Workshop (ITA), Feb. 2017, pp. 1-6.
Noh et al., "Multi-resolution codebook and adaptive beamforming sequence design for millimeter wave beam alignment," IEEE Transactions on Wireless Communications, vol. 16, No. 9, Feb. 2018, pp. 5689-5701.
Torkzaban et al., "Multi-user beam alignment in presence of multipath," arXiv:2202.06452v1 [cs.IT] Feb. 14, 2022, pp. 1-6.

* cited by examiner

Input: $\bar{\eta}_0, N, b, f_\Psi(\psi), done = \varnothing$
1: $G_N \doteq$ a set of $N$ points in $[0, 2\pi]$
2: $\{z_i\}_{i=1}^{2b} \doteq$ random points from $G_N$ such that $\bar{\eta} \leq \bar{\eta}_0$
3: $\{z_i\}_{i=1}^{2b} \Leftrightarrow \mathcal{C}_{\text{eff}} \doteq \{(z_i, z_{i+1 \mod b}), i \in [2b]\}$
4: Compute $\bar{\lambda}$ using $f_\Psi(\psi)$ and $\mathcal{C}_{\text{eff}}$
5: while not *done* do
6: $\quad (done, \bar{\lambda}, \mathcal{C}_{\text{eff}}) = modify\text{-}sol(G_N, \bar{\lambda}, \mathcal{C}_{\text{eff}}, \bar{\eta}_0)$
7: end while
8: Return $\bar{\lambda}, \mathcal{C}_{\text{eff}}$

FIG. 3

Input: $G_N$, $\bar{\lambda}$, $\mathcal{C}_{\text{eff}}$, $\bar{\eta}_0$, $s = True$, $count = 0$
1: $dir = \{forward, backward\}$, $\bar{\lambda}_{old} = \bar{\lambda}$
2: $perm = $ Shuffle $\{(p, q, r) | p, q \in [2b], r \in dir, p \leq q\}$
3: repeat
4:    Orderly select next tuple $(p, q, r)$ from $perm$
5:    Slide $\{z_i\}_{i=p}^{q}$ in $r \in dir$ direction on points in $G_N$
6:    Compute $\bar{\eta}$ using $\mathcal{C}_{\text{eff}}$
7:    if $\bar{\eta} > \bar{\eta}_0$ then
8:       $count++$
9:    else
10:       Compute $\bar{\lambda}_{new}$ using $f_\Psi(\psi)$ and $\mathcal{C}_{\text{eff}}$
11:       if $\bar{\lambda}_{new} \geq \bar{\lambda}_{old}$ then
12:          $count++$
13:       end if
14:    end if
15: until $(count = 2b^2 + b) \vee (\bar{\lambda}_{new} < \bar{\lambda}_{old})$
16: if $count = 2b^2 + b$ then
17:    Return $(True, \bar{\lambda}_{new}, \mathcal{C}_{\text{eff}})$
18: else
19:    Return $modify\text{-}sol(G_N, \bar{\lambda}_{new}, \mathcal{C}_{\text{eff}}, \bar{\eta}_0)$
20: end if

OPTIMIZING SCANNING BEAM PENETRATION

RELATED APPLICATION INFORMATION

This application claims priority to U.S. patent application Ser. No. 63/339,038, filed on May 6, 2022, incorporated herein by reference in its entirety.

BACKGROUND

Technical Field

The present invention relates to beamforming and, more particularly, to selection of scanning beam patterns.

Description of the Related Art

Millimeter wave (mmWave) radio technologies provide large amounts of bandwidth for data communications. However, high path losses and poor scattering conditions are associated with mmWave communications, leading to problems with shadowing and signal blockage, particularly in dense urban environments.

Due to the small antenna size needed for mmWave transmissions, however, arrays of antennas can be implemented in a relatively small physical space. Such arrays can be used to direct the radio energy in specific directions, avoiding power leakage to undesired directions. Establishing a communications link then becomes a challenge of identifying an appropriate angle of departure (AoD) for the beam pattern, to provide the best signal strength at a user device.

SUMMARY

A beamforming method includes determining a tradeoff curve between scanning beamwidth and transmission beamwidth based on a channel distribution for a base station. A set of scanning beams is selected based on the tradeoff curve. Devices around the base station are scanned for using the set of scanning beams. A set of transmission beams is selected for communications with the devices based on information received during the scanning. The set of transmission beams are used for transmission with a beamforming transmitter.

A beamforming control includes a hardware processor and a memory that stores a computer program. When executed by the hardware processor, the computer program causes the hardware processor to determine a tradeoff curve between scanning beamwidth and transmission beamwidth based on a channel distribution for a base station, select a set of scanning beams based on the tradeoff curve, scan for devices around the base station using the set of scanning beams, and select a set of transmission beams for communications with the devices based on information received during the scanning.

A transceiver includes a phased array antenna comprising a plurality of antenna elements, a hardware processor, and a memory that stores a computer program. When executed by the hardware processor, the computer program causes the hardware processor to determine a tradeoff curve between scanning beamwidth and transmission beamwidth based on a channel distribution for a base station, select a set of scanning beams based on the tradeoff curve, scan for devices around the base station using the set of scanning beams, select a set of transmission beams for communications with the devices based on information received during the scanning, and transmit using the set of transmission beams with the phased array antenna.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

When performing a beam search to identify the optimal angle of departure and corresponding beam pattern to use in a communications link between a transmitter and a receiver, there is a tradeoff between the coverage of the scanning beam (SB) and the gain of the transmission beam (TB) that is selected. The higher the gain of the SBs used to identify the angle of departure (AoD), the better the penetration of the SBs will be through obstacles and reflections that may lie along the signal path. However, the TV depends on the set of SBs, and by increasing the coverage of each SB, a sharper TB may be identified to increase its beamforming gain. When the coverage of an SB is increased, its gain decreases and so too does its ability to penetrate obstacles. A curve is described herein that characterizes this tradeoff, which is used to select optimal SB patterns.

To illustrate this, a millimeter wave (mmWave) communications scenario is shown with a single base station (BS) and an arbitrary number N of mobile users (MUs), where prior knowledge of the value of N may or may not be available at the BS. Beam alignment seeks to obtain accurate AoDs corresponding to downlink mmWave channels from the BS to the MUs. The BS transmits probing packets in different directions via SBs and receives feedback from the MUs. Based on this feedback, the BS computes a TB for each user.

While decreasing the TB width increases the gain of the beam, thereby making it possible to reach a receiver through an attenuating medium or across multiple reflections, this comes at the cost of increasing the average beamwidth of the scanning beams. Increasing the beamwidth of the SBs decreases their gain, making it less likely that they will be able to reach the receiver. This tradeoff is characterized herein by a curve that aids in the selection of the optimal SB beam width and corresponding TB beam width.

Figure 1:
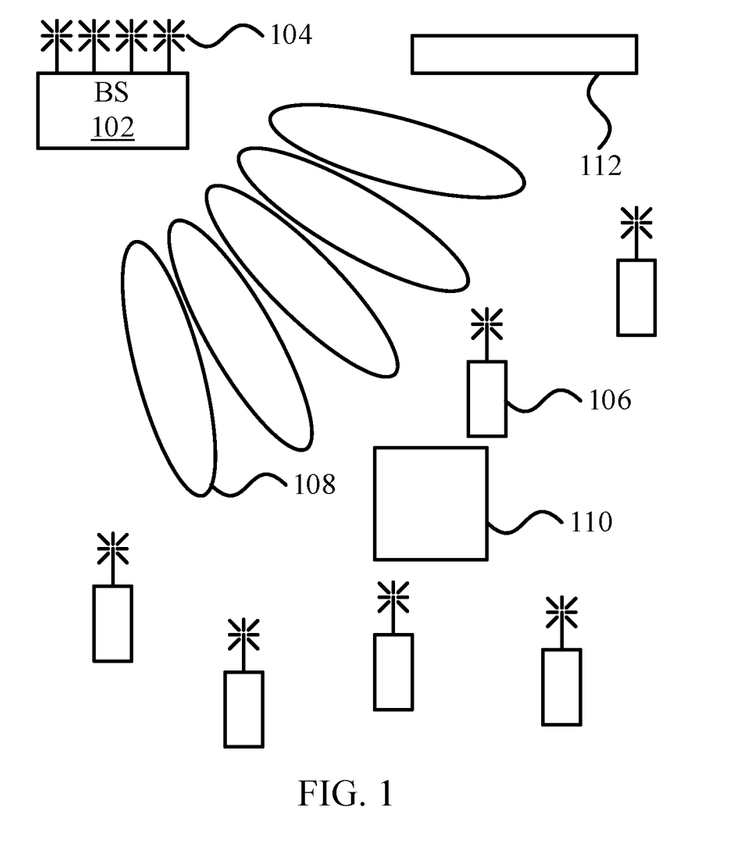
FIG. 1 is a diagram of a beamforming wireless communications system that uses a tradeoff curve to select scanning beams and transmission beams, in accordance with an embodiment of the present invention.

Referring now to FIG. 1, a communications system 100 is shown. A BS 102 includes an antenna array 104 that is capable of beam forming and may act as a transceiver that includes both a transmitter and a receiver. A set of MUs 106 are arranged in an area around the BS 102. The MUs 106 may have singular antennas or may in turn have antenna arrays. In some cases, some MUs 106 may communicate with the BS 102 using a single antenna while other MUs 106 may communicate with the BS 102 using multiple antennas.

The antenna array 104 is configured to communicate with the MUs 106 using beam patterns 108. Each beam pattern 108 corresponds to a different configuration of the antenna array 104, for example by selecting different respective phases for the constituent antennas of the antenna array 104 to create patterns of constructive and destructive interference that selectively increase the gain in a direction corresponding to a beam pattern 108 and that selectively decrease the gain in other directions.

As the MUs 106 move, entering and exiting the service area of the BS 102 and moving around obstacles 110, the path characteristics for the communication links between the BS 102 and the MUs 106 also change. For example, for an MU 106 that is positioned behind an obstacle 110, a direct path between the BS 102 and the shadowed MU 106 may not be available. In such cases, a beam pattern 108 may be selected that causes the mmWave signal to reflect off of another object 112, reaching the MU 106 by an indirect path. In another example, a beam pattern 108 may be selected with a sufficiently high gain to penetrate the obstacle 110. In either case, the signal experiences greater loss than if it had passed through free space, and a higher beam gain can overcome that loss.

The beams 108 may represent either SBs or TBs. During a scanning process, the BS 102 transmits using a series of SBs using different beam patterns 108 and collects feedback from MUs 106 that receive the SBs. Based on the received feedback, the BS 102 selects particular beam patterns 108 as TBs for respective MUs 106. The BS 102 then transmits information to the MUs 106 using the respective TBs. The scanning process may be repeated periodically, for example after a predetermined amount of time has passed, and/or adaptively, for example responsive to changes in signal characteristics as the MUs 106 move.

As used herein, the operator \ denotes the set minus operation, [b] denotes the set of all integers greater than or equal to zero and less than b, $\oplus$ and $\ominus$ denote the summation and subtraction operations in the base b, and $|\cdot|$ denotes the cardinality if applied to asset or the Lebesgue measure if applied to an interval.

The mmWave channels from the BS 102 to the MUs 106 may include up to p resolvable paths, where each resolvable path corresponds to a possible AoD of the channel. The term $\Psi_j = \{\psi_{ij}\}_{i=1}^p$ denotes a random AoD vector corresponding to the channel between the BS 102 and the $j^{th}$ MU 106, where $\psi_{ij}$ represents the AoD of the $i^{th}$ path. The probability density function (PDF) of $\Psi_j$ may be defined as $f_{\Psi_j}(\psi_{1,j}, \ldots, \psi_{i,j})$ over the angular domain $\mathcal{D} \in (0, 2\pi]^p$. The PDF $f_{\Psi_j}(\cdot)$ encapsulates the knowledge about the AoD of the $j^{th}$ user prior to the beam alignment process, or may act as a priority function over the angular search domain. Such information may be inferred from previous beam tracking, training, or alignment trials. The collection of AoDs may be understood as a distribution of channel paths. In the worst-case scenario, a uniform distribution may be interpreted as corresponding to the lack of any prior knowledge or priority over the search domain. Other exemplary distributions include a two-uniform (or piecewise uniform) distribution and a cut-normal distribution, which have strictly lower values for average TB size for any value of the average SB size than does the uniform distribution.

The antenna array 104 has enough antenna elements to produce beam patterns 108 with a high resolution, such that there are many beam patterns 108 available. For power efficiency, the antenna array 104 may use a hybrid beam-forming approach that includes fewer signal chains than antenna elements. A sectored antenna model may be used, where each beam is modeled by a constant gain of its main love and the angular coverage interval (ACI) that the main lobe covers.

A time-slotted model may further be used, with time domain duplexing (TDD) frames of length T. The frames may include T equal slots, with the first b slots being dedicated to the transmission of probing packets and with the next d slots being allocated to receiving user feedback. The b time slots are referred to herein as scanning time slots, while the d time slots are referred to herein as feedback time slots. The user feedback may be transmitted to the BS 102 by a side channel or according to any appropriate access mode. The last T-b-d slots may then be reserved for data transmission, referred to herein as data transmission time slots.

The beam alignment process seeks to generate the narrowest possible TBs for the data transmission phase for the MUs 106, with narrower TBs providing higher gain and signal quality. The BS 102 thereby aims at localizing the AoDs for the MUs 106 to minimize an uncertainty region for the AoDs. The term $\mathcal{B} = \{\Phi_i\}_{i=1}^b$ represents the set of scanning time slot scanning beams, where $\Phi_i$ is the ACI of the SB sent over the time slot $i \in [b]$.

The feedback provided by the MUs 106 to the SBs may be binary. If the AoD corresponding to at least one resolvable path in the channel from the BS 102 to an MU 106 is within the ACI of the SB, then the MU receives the probing packet sent via that SBB and feeds back an acknowledgement (ACK). Otherwise, the lack of feedback from the MU 106 may be regarded as a negative acknowledgement (NACK) indicating that none of the user AoDs lie in the ACI of the SB. Once the feedback time slots end, the BS 102 determines the TBs using the SBs and the feedback sequences provided by the MUs 106 according to a beam alignment policy. The beam alignment policy may be formally defined as a function from the set of feedback sequences to the set of TBs.

To reach more distant MUs 106 in the scanning phase of the beam alignment process, a set of SBs with high-gain beam patterns 108 may be used. However, there is a limit to the size of the SBs if the entire angular domain $\mathcal{D}$ is to be covered. The union of the set of SBs, particularly in terms of their combined ACIs, should be at least equal to $\mathcal{D}$ to provide complete coverage. Additionally, the intersections of the SBs contribute to the possibility of finding additional TBs, which in turn allows for optimizing the set of TBs. Thus, using narrower TBs comes at the expense of having larger SBs, such that there is a tradeoff between the bandwidth of the beams in the SB and the TB sets.

A beam alignment policy determines how the directions of the TBs are set. The uncertainty regions of the AoDs of the user channels are considered. Exemplary beam alignment policies include a spatial diversity and a beamforming policy. The spatial diversity policy generates TBs with a minimal angular span that covers all the angular intervals that may include a resolvable path. The beamforming policy generates TBs that cover at least one resolvable path, but further reduce the angular span of the TBs. The spatial diversity policy is resilient against potential failure or blockage of one or more of the spatial clusters as long as at least one resolvable path remains, but the beamforming policy has the advantage of producing higher beamforming gains while being vulnerable to path blockage.

The term $B_\mathcal{P}^j(\mathcal{B}, s)$ denotes the uncertainty region of the $j^{th}$ MU providing feedback sequence s under the policy $\mathcal{P}$ and the SB set $\mathcal{B}$, where $\mathcal{P}$ is selected from the spatial diversity and beamforming policies. The positivity set $A^j(s) \subseteq [b]$ is the set of all indices corresponding to the SBs that are acknowledged by the $j^{th}$ user. The negativity set $N^j(s) \subseteq [b]$ is a set of all indices corresponding to SBs that are not acknowledged by the $j^{th}$ user.

If the $j^{th}$ user sends an acknowledgement in response to SB $\Phi_i$, then $\Theta_i(s) \doteq \Phi_i$ has at least one resolvable path. On the other hand, a NACK indicates that there are no resolvable paths in $\Phi_i$ and that, therefore, any resolvable path will exist in $\Theta_i(s) \doteq \mathcal{D} - \Phi_i$, with $B_\mathcal{P}^i(\mathcal{B}, s) \in \mathcal{D} - \Phi_i$ for the policies described above. The uncertainty region for the policies, $B_{SD}^j$ for spatial diversity and $B_{BF}^j$ for beamforming, can be expressed as:

$$B_{SD}^j(s) = (\cup_{i \in A(s)} \Theta_i(s)) \cap (\cap_{i \in N(s)} \Theta_i(s))$$

$$B_{BF}^j(s) = \Theta_k(s) \cap (\cap_{i \in N(s)} \Theta_i(s))$$

where $$k = \arg\min_{l \in A(s)} \left| \Theta_l(s) \cap \left( \bigcap_{i \in N(s)} \Theta_i(s) \right) \right|$$

and $\Theta_i$ is a beam equal to the SB $\Phi_i$ if an acknowledgement is received and is equal to the complement of $\Phi_i$ if no acknowledgement is received.

The beam alignment process is formulated under the assumption that there are N users, prioritized according to the weight vector $\{c_j \geq 0\}_{j=1}^N$, where $\Sigma_{j=1}^N = c_j = 1$. The term $\mathcal{U} = \{u_k\}_{k=1}^M$ denotes the range of the policy function $B_\mathcal{P}^j(\mathcal{B}, s)$. The TBs that result from the beam alignment process may take any value in the set $\mathcal{U}$. The expected value of the average beamwidth resulting beam alignment scheme for policy $\mathcal{P}$ is:

$$\overline{U}_\mathcal{P}(\mathcal{B}) = \sum_{j=1}^N c_j \mathbb{E}[|B_{\mathcal{P}(s)}|]$$

where $$\mathbb{E}[|B_\mathcal{P}(s)|] = \sum_{k=1}^M |u_k| P\{B_\mathcal{P}(s) = u_k\}$$

and $|u_k|$ denotes the Lebesgue measure of $u_k$. The term $u_k$ may be a finite union of multiple intervals in which case $|u_k|$ will be a sum of their widths. Given the value of b, the objective of the beam alignment is to design $\{\Phi_i\}_{i=1}^b$ such that the expected average TB beamwidths get minimized:

$$\{\Phi_{i=1}^*\} = \arg\min_{\{\Phi_i\}_{i=1}^b} \overline{U}_\mathcal{P}(\{\Phi_i\}_{i=1}^b)$$

Among the set of continuous scanning beams, a set of scanning beams with a tulip design, described in greater detail below, generates the maximal number of possible feedback sequences for the channel with p=1 and 2, for an arbitrary distribution of channel AoD that is non-zero on any points in the range $[0, 2\pi)$.

Figure 2:
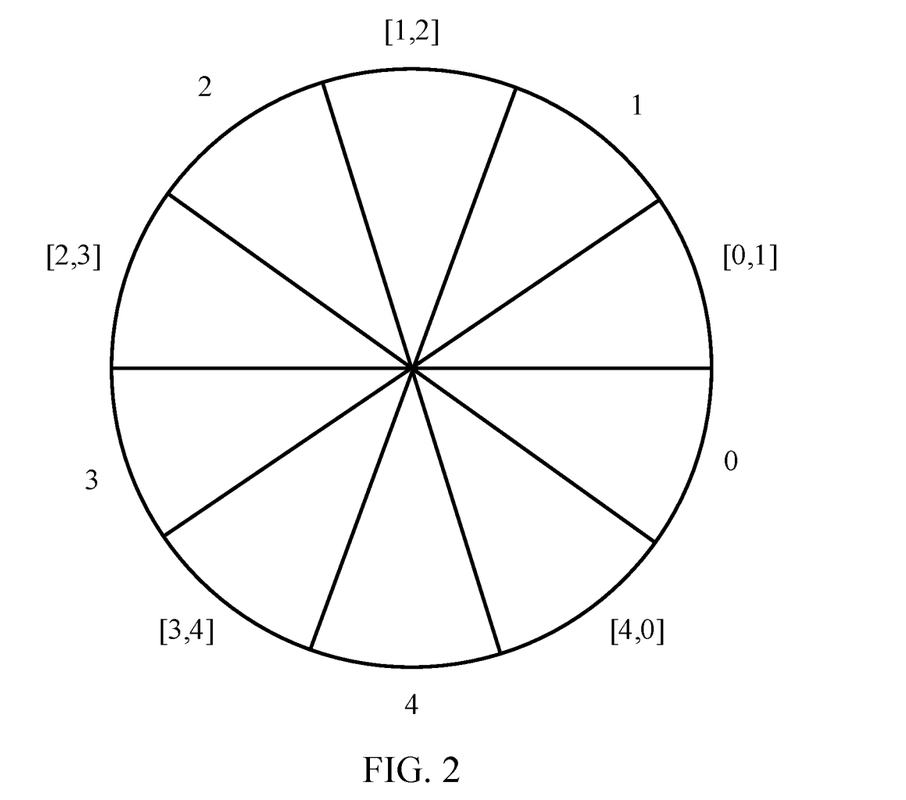
FIG. 2 is a diagram of a tulip design for a set of scanning beam patterns, where scanning beams overlap with neighboring scanning beams, in accordance with an embodiment of the present invention.

Referring now to FIG. 2, an example of a tulip design is shown. The tulip design is given by a set of contiguous SBs $\mathcal{B} = \{\Phi_i\}$, $i \in [b]$, where each beam may have intersection with its adjacent beams with the exception of $\Phi_1$ and $\Phi_b$, for which the intersection might be non-empty. As a result, $\Phi_i \cap \Phi_j = \emptyset$ $1 < |i-j| < b-1$. Any scanning beam in the tulip design includes two side lobes (common between two neighboring scanning beams) and one middle lobe, where the side lobes overlap with side lobes of neighboring beams. Each component is referred to herein as a component beam (CB) forming a set $\mathcal{C}$. The middle lobes are referred to herein as CBs of a first type $\mathcal{C}^1$ and the side lobes are referred to herein as CB s of a second type $\mathcal{C}^2$.

In the example of FIG. 2, the CB sets are designated as:

$$\mathcal{C}^1 = \{0,1,2,3,4\}$$

$$\mathcal{C}^2 = \{[0,1],[1,2],[2,3],[3,4],[4,0]\}$$

The beamwidth $\lambda_\mathcal{P}(s)$ of the TB for the received feedback sequence s and the beamwidth $\eta_i = |\Phi_i|$ of the SB are used to generate a tradeoff curve. A measure $\mu(\cdot)$ is a function from a set of real numbers to a single real number. Two such measures, max and average, are considered.

The max function may be defined as $\mu_1(\{\eta_i\}_{i=1}^b) = \max(\{\eta_i\}_{i=1}^b)$ and the average function may be defined as $$\mu_2(\{\eta_i\}_{i=1}^b) = \left(\frac{1}{b}\right)\sum_{i=1}^b \eta_i.$$

The tradeoff curve for a policy $\mathcal{P}$, using b scanning beams for the channel with p path is defined as minimum value of $\mu(\{\lambda_\mathcal{P}(s)\}_{s \in S})$, where S is the set of all possible feedback sequences.

All possible SB designs may contribute to the tradeoff curve. Some SB designs outperform other designs in terms of this tradeoff between SB and TB sizes. In particular, for the channel with a single dominant path p=1, the tradeoff curve is always achieved by a tulip design for both the max and average measures.

For p=1, both spatial diversity and beamforming policies collapse into one. Different measures for SBs and TBs can be taken into account to demonstrate the tradeoff. For the max measure, the pair $(\eta_{max}, \lambda_{max})$ may be considered, where $\lambda_{max}$ represents the maximum resulting beamwidth of the beams in the TB set and $\eta_{max}$ denotes the maximum beamwidth for the set of SBs.

For a given value of $\eta_{max}$ there is a minimum achievable $\lambda_{max}^{min}$. The tradeoff curve may be defined as the set of all achievable points defined by $(\eta_{max}, \lambda_{max}^{min})$. Alternatively, for a given value of $\lambda_{max}$, there is a minimum achievable $\eta_{max}^{min}$. The tradeoff curve may also therefore be formulated as the set of all achievable points defined by $(\eta_{max}^{min}, \lambda_{max})$. For an average measure, the pair $(\overline{\eta}, \overline{\lambda})$ may be used, where $\bar{\lambda}$ represents the average resulting beamwidth for the TB set and $\bar{\eta}$ denotes the average beamwidth for the set of SBs.

The optimal beam alignment process is achieved by a SB set that follows a tulip design. Each SB can be represented by its coverage interval, which is an arc on a circle. Moving in a clockwise direction, each SB has a starting point and an ending point on the circle. For example, in FIG. 2 the SB beam that centers on the main lobe CB 1 has a coverage interval that includes side lobe CBs [0, 1] and [1, 2]. A marker may be defined as any starting point or ending point. In general, multiple starting or ending points may be concurrent, in which case the markers are referred to herein as a non-singular marker. If a marker only represents a single starting point or a single ending point, it is referred to herein as a singular marker.

Each non-singular marker may be exchanged with multiple singular markers which are only a differential distance apart on the circle, in such a way that all starting points are moved in a clockwise direction and all ending points are moved in a counter-clockwise direction. With 2b markers and 2b arcs on the circle, each SB includes one or more adjacent arcs. An arc may be shared between multiple SBs. The order of an arc is the number of SBs that intersect with the arc. Since each SB is contiguous and each marker is singular, the order of the arcs are alternatively odd and even on the circle. Thus, the order on the arc in a tulip design alternates between 1 and 2. Regardless of the measure function used, the tulip design achieves the tradeoff curve.

This holds for any channel distribution or distribution of paths. For the case of a multipath channel, p≥2, there may be an optimal beam alignment scheme that does not follow the tulip design, due to the TB being a composite of multiple arcs. Even in such cases, an achievable tradeoff curve for the tulip design can be obtained without a claim of optimality. The tradeoff curve for the average measure and uniform distribution follows a polynomial from order 2—thus $\bar{\lambda}$ is a polynomial of degree 2 in terms of $\eta$. For any SB design, $\gamma \leq \bar{\eta} \leq 2\gamma$. In some cases, the tradeoff curve for $\gamma \leq \bar{\eta} \leq 1.5\gamma$ is of interest to minimize both $\bar{\eta}$ and $\bar{\lambda}$. The quantity $\gamma$ is equal to $2\pi/b$.

Figure 3:
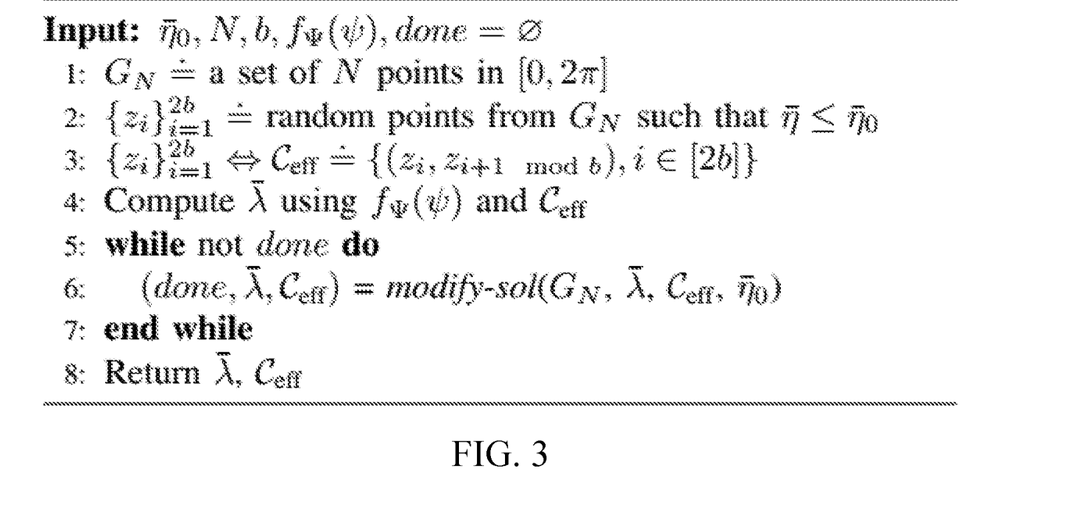
FIG. 3 is pseudo-code showing part of process for determining the tradeoff curve, in accordance with an embodiment of the present invention.

Referring now to FIG. 3, pseudo-code is shown to compute the minimum average beamwidth for the TBs. The curve is determined for a given value of $\bar{\eta}=\bar{\eta}_0$, an initial value for $\bar{\eta}_0$ can be set to $\gamma$ and can be increased by $\delta$ incrementally. At each step, for a given value of $\bar{\eta}_0$, the minimum $\bar{\lambda}$ can be determined by iterating for a predetermined number of trials, where at least one starting set of SBs defined by $\{z_i\}_{i=1}^{2b}$ at each step is the one that corresponds to the minimum value of $\bar{\lambda}$ in the previous step.

To compute $\bar{\lambda}$, the pseudocode randomly generates user paths based on $f(\psi)$. The beams defined by $C_{eff}$ are used as probing beams to generate the feedback sequence. Based on the feedback and the policy, a transmission beam is generated, where the average of the TBs is $\bar{\lambda}$ by random generation of user paths.

This pseudo-code uses a greedy method to find the minimum value for the average beamforming beamwidth $\bar{\lambda}$ for a given value of the average SB beamwidth $\bar{\eta}$. This produces the actual SBs which come close to achieving the best tradeoff for a given average SB beamwidth, outputting that as $C_{eff}$, along with the value of the average TB beamwidth for a given distribution $\bar{\lambda}$.

If the distribution is not available, a uniform distribution can be used as a worst-case scenario. After a set of SBs has been generated, some knowledge of the distribution of user channels is retained, so that the next set of SBs can be adapted based on the previously acquired distribution.

The tradeoff curve reaches its minimum at $\bar{\eta}=1.5\gamma$, so values of $\bar{\eta}>1.5\gamma$ are not searched. After the tradeoff curve reaches its minimum point at $\bar{\eta}*$, increasing the value beyond this point does not improve the curve.

Figure 4:
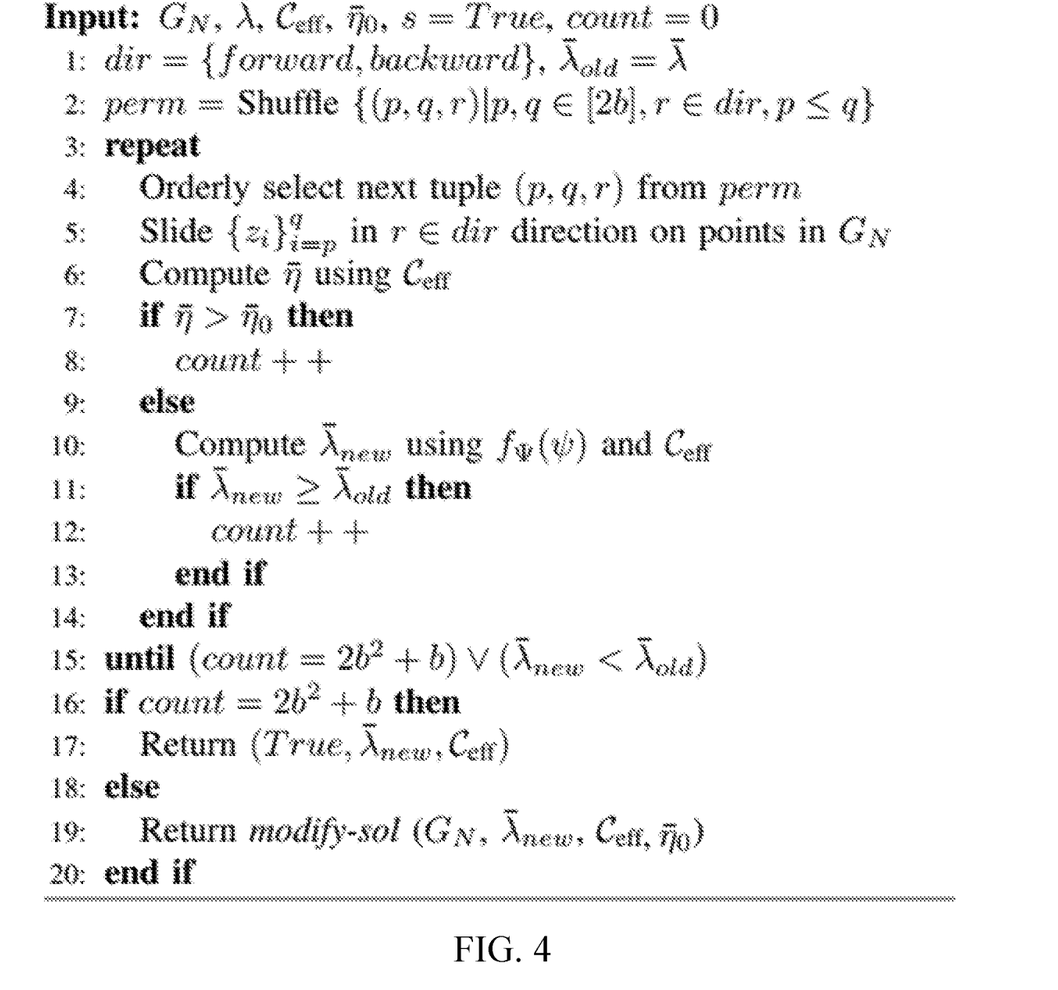
FIG. 4 is pseudo-code showing part of process for determining the tradeoff curve, in accordance with an embodiment of the present invention.

Referring now to FIG. 4, pseudo-code is shown for the modify-sol function used in the pseudo-code of FIG. 3. This function is performed recursively to adjust SBs and update the distribution, with each level of recursion iterating a maximum of $2b^2+b$ times. As shown in FIG. 3, the modify-sol function will continue to be executed until a "done" signal is returned, which may correspond to reaching the maximum count. Otherwise, the function recursively calls itself with a new distribution $\bar{\lambda}$. The computation of $\bar{\eta}$ is similar to that of $\bar{\lambda}$, with user paths being randomly generated based on $f(\psi)$. The average of the probing beams defined by $C_{eff}$ can then be used as $\bar{\eta}$.

Figure 5:
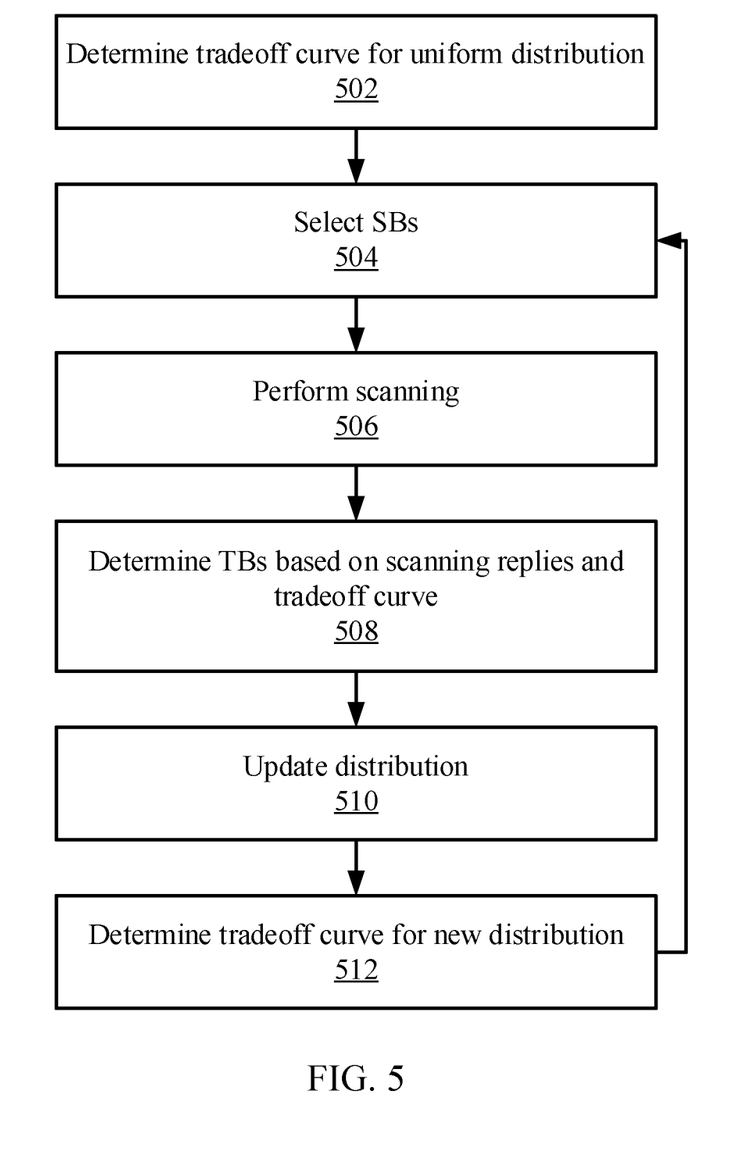
FIG. 5 is a block/flow diagram of a method for selecting scanning beams using the tradeoff curve, in accordance with an embodiment of the present invention.

Referring now to FIG. 5, a method of selecting SBs and TBs is shown. Block 502 begins by determining a tradeoff curve for a uniform channel distribution, as it cannot be assumed that knowledge of the locations of the user devices are known in advance. The tradeoff curve indicates TB sizes that correspond to SB sizes. Block 504 then selects an average SB beamwidth based on the required penetrations of the SBs in the given environment. The tradeoff curve informs the selection of SBs, as it indicates whether the corresponding average TB beamwidth is within a desired range.

Based on the environment, the penetration needed for scanning and the beamforming gain needed for a given throughput or quality of service can be selected. The tradeoff curve provides a validation for the desired values for both penetration of the scanning beam and the beamforming gain of the transmission beam.

Using the selected set of SBs, block 506 performs scanning to determine AoDs for the MUs 106. The scanning 506 may include sending scanning signals using respective SBs from the selected set and receiving replies from any MUs 106 that receive the scanning signals. Block 508 determines TBs to be used to communicate with the MUs 106, with the TBs being based on the tradeoff curve and the scanning replies. The TBs may be used to communicate with the MUs 106.

After a predetermined time has passed, or after an above-threshold change in channel characteristics has been detected in communications with the MUs 106 has been detected, the SBs may be refreshed to identify a new set of TBs, for example to better communicate with MUs 106 that have moved and/or to identify MUs 106 that have recently come into range. Block 510 updates the channel distribution to reflect the last measurements and block 512 determines a new tradeoff curve for the updated channel distribution. New SBs are selected in block 504 and the process repeats.

Figure 6:
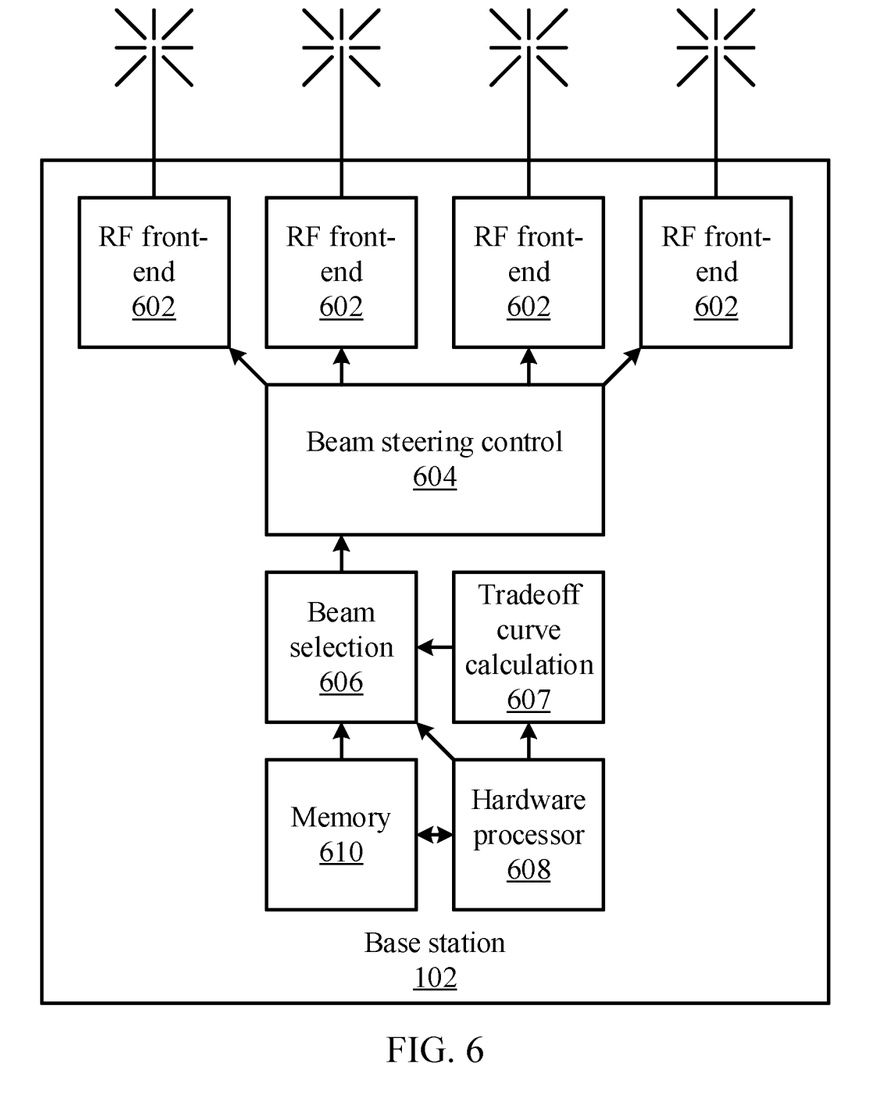
FIG. 6 is a block diagram of a wireless base station that performs beam selection using the tradeoff curve, in accordance with an embodiment of the present invention.

Referring now to FIG. 6, additional detail on the base station 102 is shown. The base station 102 includes a set of radio-frequency (RF) front-ends 602. The RF front-ends 602 feed RF signals to antennas 104. Any appropriate arrangement and number of RF front-ends 602 and antennas 104 may be used. For example, in analog beamforming, a single RF signal is fed to each of the RF front-ends 602. The RF front-ends 602 adjust phase and amplitude of their respective signals to create a beam pattern by the interference of signals emitted by the antennas 104. In digital beamforming, individualized signals are sent to the antennas 104 according to precoding information, and the emitted individual signals interfere to create the beam. In a hybrid beamforming system, the number of RF signals is fewer than the number of antennas 104, but greater than one, with subsets of the antennas 104 being fed by respective RF signals.

Beam steering control 604 determines and implements the parameters needed to achieve a particular beam pattern. For example, in an analog beamforming embodiment, the beam steering control 604 may determine a set of phase shifts and amplitude adjustments to send to the respective RF front-ends. In a digital beamforming embodiment, the beam steering control 604 may apply a precoding matrix to the different RF signals.

The beam steering control 604 implements beam patterns (e.g., the SBs and TBs described herein) according to beam selection 606. In the context of the present embodiments, the beam selection 606 may determine SBs in accordance with a tradeoff curve calculation 607, to ensure that the selected SBs correspond to appropriate TBs. Once the scanning process has been completed, the beam selection 606 may select TBs to use to communicate with each of the MUs 106.

As noted above, the tradeoff curve calculation 607 is sensitive to the distribution of MUs 106 around the base station 102. In a worst-case scenario, where no priori knowledge of the distribution is available, the tradeoff curve calculation may be based on a uniform distribution. Other exemplary distributions include a cut-normal distribution and a piece-wise uniform distribution, though it should be understood that any appropriate distribution may be selected in accordance with previously collected channel distribution data.

The base station 102 include a hardware processor 608 and a memory 610. The memory 610 may store software that performs the beam selection 606 and the tradeoff curve calculation 607. The memory 610 may further store information regarding the channel distribution. The hardware processor 608 executes the software stored in the memory 610 to perform the beam selection 606 and tradeoff curve calculation 607 functions, and can provide any other functions needed to control the base station 102.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A beamforming method, comprising:
determining a tradeoff curve between scanning beamwidth and transmission beamwidth based on a channel distribution for a base station with a recursive process that stops responsive to reaching a level of recursion where a number of tested beam patterns equals $2b^2+b$, where b is a number of scanning time slots;
selecting a set of scanning beams based on the tradeoff curve;
scanning for devices around the base station using the set of scanning beams;
selecting a set of transmission beams for communications with the devices based on information received during the scanning; and
transmitting using the set of transmission beams with a beamforming transmitter.

2. The method of claim 1, wherein determining the tradeoff curve includes determining an initial tradeoff curve based on a uniform channel distribution.

3. The method of claim 1, further comprising determining an updated tradeoff curve based on a new channel distribution that accounts for the information received during the scanning.

4. The method of claim 3, further comprising repeating the selection of the set of scanning beams, the scanning, the selection of the set of transmission beams, and the communicating based on the updated tradeoff curve.

5. The method of claim 3, wherein the new channel distribution is selected from the group consisting of a piecewise uniform distribution and cut-normal distribution.

6. The method of claim 1, wherein the set of scanning beams includes a tulip design, such that each scanning beam overlaps with two neighboring scanning beams.

7. A beamforming control, comprising:
a hardware processor; and
a memory that stores a computer program which, when executed by the hardware processor, causes the hardware processor to:
determine a tradeoff curve between scanning beamwidth and transmission beamwidth based on a channel distribution for a base station with a recursive process that stops responsive to reaching a level of recursion where a number of tested beam patterns equals $2b^2+b$, where b is a number of scanning time slots;
select a set of scanning beams based on the tradeoff curve;
scan for devices around the base station using the set of scanning beams; and
select a set of transmission beams for communications with the devices based on information received during the scan.

8. The beamforming control of claim 7, wherein the computer program further causes the hardware processor to determine an initial tradeoff curve based on a uniform channel distribution.

9. The beamforming control of claim 7, wherein the computer program further causes the hardware processor to determine an updated tradeoff curve based on a new channel distribution that accounts for the information received during the scanning.

10. The beamforming control of claim 9, wherein the computer program further causes the hardware processor to repeat the selection of the set of scanning beams, the scan, and the selection of the set of transmission beams based on the updated tradeoff curve.

11. The beamforming control of claim 9, wherein the new channel distribution is selected from the group consisting of a piecewise uniform distribution and cut-normal distribution.

12. The beamforming control of claim 7, wherein the set of scanning beams includes a tulip design, such that each scanning beam overlaps with two neighboring scanning beams.

13. A transceiver, comprising:
a phased array antenna comprising a plurality of antenna elements;
a hardware processor; and
a memory that stores a computer program which, when executed by the hardware processor, causes the hardware processor to:
determine a tradeoff curve between scanning beamwidth and transmission beamwidth based on a channel distribution for a base station with a recursive process that stops responsive to reaching a level of recursion where a number of tested beam patterns equals $2b^2+b$, where b is a number of scanning time slots;
select a set of scanning beams based on the tradeoff curve;
scan for devices around the base station using the set of scanning beams;
select a set of transmission beams for communications with the devices based on information received during the scan; and
transmit using the set of transmission beams with the phased array antenna.

14. The transceiver of claim 13, wherein the computer program further causes the hardware processor to determine an initial tradeoff curve based on a uniform channel distribution.

15. The transceiver of claim 13, wherein the computer program further causes the hardware processor to determine an updated tradeoff curve based on a new channel distribution that accounts for the information received during the scanning.

16. The transceiver of claim 15, wherein the computer program further causes the hardware processor to repeat the selection of the set of scanning beams, the scan, and the selection of the set of transmission beams based on the updated tradeoff curve.

17. The transceiver of claim 15, wherein the new channel distribution is selected from the group consisting of a piecewise uniform distribution and cut-normal distribution.

\* \* \* \* \*